US011544381B2

(12) United States Patent
Lundeby et al.

(10) Patent No.: US 11,544,381 B2
(45) Date of Patent: Jan. 3, 2023

(54) CONFIGURATION OF SERVER USING STORED SECURITY ELEMENTS

(71) Applicant: Hewlett Packard Enterprise Development LP, Houston, TX (US)

(72) Inventors: Bruce A. Lundeby, Ft. Collins, CO (US); Abhay Padlia, Bangalore (IN); Raghu Narasimha Murthy, Bangalore (IN); Parul Tyagi, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 342 days.

(21) Appl. No.: 16/458,284

(22) Filed: Jul. 1, 2019

(65) Prior Publication Data
US 2021/0004464 A1 Jan. 7, 2021

(51) Int. Cl.
*H04L 29/06* (2006.01)
*G06F 21/57* (2013.01)
*G06F 21/10* (2013.01)
*H04L 41/082* (2022.01)
*H04L 9/40* (2022.01)
*G06F 21/44* (2013.01)

(52) U.S. Cl.
CPC ............ *G06F 21/57* (2013.01); *G06F 21/105* (2013.01); *G06F 21/44* (2013.01); *H04L 41/082* (2013.01); *H04L 63/083* (2013.01); *H04L 2463/101* (2013.01)

(58) Field of Classification Search
CPC ................................. G06F 21/57; H04L 41/08
See application file for complete search history.

(56) References Cited

U.S. PATENT DOCUMENTS

| 7,577,722 B1 * | 8/2009 | Khandekar ......... G06F 9/45558 709/220 |
| 7,600,005 B2 * | 10/2009 | Jamkhedkar .............. G06F 8/60 709/220 |
| 7,614,050 B2 | 11/2009 | Sasaki et al. |
| 8,443,365 B2 | 5/2013 | Kumar |
| 10,181,037 B2 | 1/2019 | Novak et al. |
| 2012/0089972 A1 | 4/2012 | Scheidel et al. |
| 2013/0262923 A1 | 10/2013 | Benson et al. |
| 2017/0013021 A1 | 1/2017 | Hoy et al. |

(Continued)

OTHER PUBLICATIONS

Jaw Consulting UK, "Build & Configuration Security Review," 2019, pp. 1-2 (online), Retrieved from the Internet on Feb. 28, 2019 at URL: <jawconsulting.co.uk/practice-areas/penet.

(Continued)

*Primary Examiner* — Jason K Gee
(74) *Attorney, Agent, or Firm* — Trop, Pruner & Hu, P.C.

(57) ABSTRACT

In one implementation, a computing device includes a secure storage to store a plurality of security elements, a processor, and a storage medium including instructions. The instructions are executable by the processor to: receive a configuration request for a first server, the configuration request including one or more logical references to security settings of the first server; retrieve, from the secure storage, one or more security elements corresponding to the one or more logical references in the configuration request; and configure an operating system volume for the first server based on the configuration request and the one or more security elements.

13 Claims, 7 Drawing Sheets (56) References Cited

U.S. PATENT DOCUMENTS

| | | | | |
|---|---|---|---|---|
| 2017/0237560 A1* | 8/2017 | Mueller | ................ | G06F 21/72 |
| | | | | 713/168 |
| 2017/0250918 A1* | 8/2017 | Billore | ................ | H04L 41/5054 |
| 2018/0081702 A1 | 3/2018 | Cohen et al. | | |
| 2018/0365046 A1* | 12/2018 | S S | ................ | G06F 9/4411 |
| 2019/0102526 A1* | 4/2019 | Koul | ................ | G06F 21/31 |

OTHER PUBLICATIONS

Lenovo, "Lenovo XClarity Administrator User's Guide," Dec. 2018, pp. 1-530, Version 2.3.0, Fourth Edition.

Microsoft, "Security and Privacy for OS Deployment in Configuration Manager," Jun. 10, 2016, pp. 1-7 (online), Retrieved from the Internet on Feb. 28, 2019 at URL: <docs.microsoft.com/en-us/sccm/osd/plan-design/security-and-privacy-for-operating-system-deployment>.

\* cited by examiner

CONFIGURATION OF SERVER USING STORED SECURITY ELEMENTS

BACKGROUND

A computing system can include any number of computing devices and components. For example, a server enclosure (e.g., a rack) may include multiple computing modules (e.g., blade servers), networking devices, storage devices, power supply components, and so forth. Each computing module may include hardware computing components, such as processors, memory devices (e.g., dynamic random access memory (DRAM), static random-access memory (SRAM), etc.), storage devices (e.g., hard drives, flash storage, optical disks, etc.), network interface devices, user input devices, power supply devices, display devices, and so forth. The server enclosure may be included in a larger system providing computing services (e.g., a datacenter, a cluster, and so forth).

BRIEF DESCRIPTION OF THE DRAWINGS

One or more example implementations are described with respect to the following figures.

DETAILED DESCRIPTION

In some information technology (IT) environments, servers may be configured and/or deployed in response to a user need or business demand. For example, a new server may be configured and deployed in response to an increase in a number of computing users, an addition of a new corporate client, an introduction of a new support application, and so forth. In another example, a new server may be deployed in response to time-variable processing loads (e.g., heavier processing load during business hours, deferred processing during evening hours, and so forth). In some examples, deploying each server may include manually configuring various security software and settings of the server. For example, the security configuration of a new server may include setting user passwords, installing keys, configuring certificates, loading licenses, setting application authorizations, setting permissions, and so forth. However, such manual configuration may be time-consuming and error-prone. Further, because human users may configure security software and settings, such configuration may introduce the risk of data theft of secret information (e.g., passwords, keys, etc.).

As described further below with reference to FIGS. 1-6, some implementations may provide server configuration using stored security elements. As used herein, "security elements" refers to data elements used to configure the security of a server. For example, security elements may include passwords, certificates, security settings, licenses, keys, and so forth. In some implementations, security elements may be pre-loaded into a secure storage of a device for later use in configuring multiple servers. The stored security elements may be unreadable from outside the device. Upon receiving a configuration request, the device may automatically configure the server using a subset of the stored security elements, and may then delete those security elements from the secure storage. In this manner, servers may be automatically configured with security information while reducing the risk of human error and/or data theft.

Figure 1:
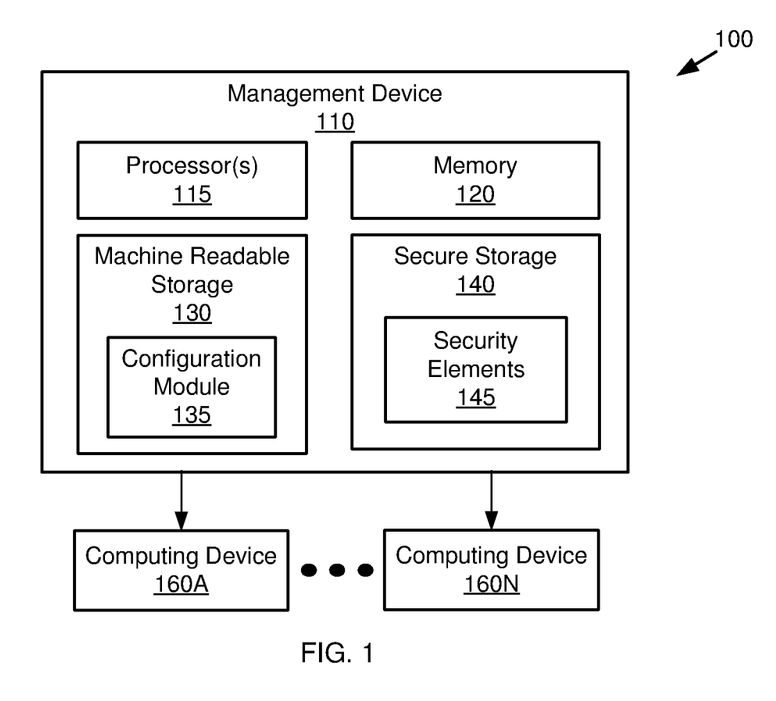
FIG. 1 is a schematic diagram of an example system, in accordance with some implementations.

FIG. 1 is a schematic diagram of an example system 100, in accordance with some implementations. As shown, the system 100 may include a management device 110 to configure and/or deploy any number of computing devices 160A-160N (also referred to collectively as "computing devices 160," or individually as a "computing device 160"). For example, the computing devices 160 may include servers, desktop computers, appliances, laptops, bladed servers, communication devices, network devices, and so forth.

In some implementations, the computing devices 160 may be stateless servers. As used herein, "stateless server" refers to a physical server that includes a processor, but lacks storage (e.g., hard disks, flash storage, optical disks, etc.) for storing operating system and application data. For example, a stateless server may boot and run from an operating system image stored on a remote device.

In some implementations, the management device 110 may be a computing device (e.g., a server, an appliance, etc.) including processor(s) 115, memory 120, machine-readable storage 130, and secure storage 240. The processor(s) 115 can include a microprocessor, a microcontroller, a processor module or subsystem, a programmable integrated circuit, a programmable gate array, multiple processors, a microprocessor including multiple processing cores, or another control or computing device.

The memory 120 can be any type of computer memory (e.g., dynamic random access memory (DRAM), static random-access memory (SRAM), etc.). In some implementations, the machine-readable storage 130 and/or the secure storage 140 may include non-transitory storage media such as hard drives, flash storage, optical disks, etc.

As shown, the secure storage 140 may include security elements 145. In some examples, the security elements 145 may include sensitive information that is to be kept secret (e.g., passwords, certificates, security settings, licenses, keys). Further, as shown, the machine-readable storage 130 may include a configuration module 135. The configuration module 135 may be implemented in machine-readable instructions (e.g., software and/or firmware).

In one or more implementations, the configuration module 135 may configure the computing devices 160 using the security elements 145. For example, the configuration module 135 may read a subset of the security elements 145 from the secure storage 140, and may use that subset of security elements 145 to configure security software and/or settings of computing device 160A. In some examples, the configuration module 135 may use a security element 145 to directly populate a security setting or value (e.g., a password). Further, in other examples, the configuration module 135 may use a security element 145 to generate a new data that can then be used as a security setting or value (e.g., to generate a public key infrastructure (PKI) certificate). In some implementations, a security element 145 may be deleted from the secure storage 140 after being used in a device configuration.

In one or more implementations, the secure storage 140 may protect the security elements 145 from unauthorized access. For example, the security elements 145 may be encrypted using encryption hardware and/or software of the secure storage 140. In some implementations, the security elements 145 may be stored using a write-only interface into the secure storage 140. Once stored, the security elements 145 may only be readable by the configuration module 135 (e.g., via a dedicated and isolated interface to the secure storage 140). In such implementations, the security elements 145 may not be accessed by a human user of the management device 110, by a device external to the management device 110, and so forth.

In some implementations, access to the security elements 145 may be protected using one-time pad values that are pre-loaded in the management device 110. In some examples, the one-time pad values may be validated locally (e.g., against a portable device such as smartphone) or remotely (e.g., against a remote server). Such validation may be performed using two-factor authentication (e.g., a combination of two of password, biometric factor, text message, email, etc.).

In some implementations, the secure storage 140 may be pre-loaded with a number of security elements 145 that is sufficient to configure multiple computing devices 160. As used herein, "pre-loading" refers to storing security elements 145 prior to receiving information regarding a specific device configuration that will use those security elements 145 (e.g., a configuration request). In some implementations, the security elements 145 may be pre-loaded as a batch by an authorized entity (e.g., a security administrator) via a write-only interface of the secure storage 140. Further, in some examples, the security elements 145 may be pre-loaded at a time of manufacture of the management device 110, during a maintenance period of the management device 110, and so forth.

In one or more implementations, the configuration module 135 may configure the computing devices 160 in response to receiving configuration requests. A configuration request may specify attributes of a particular device configuration, such as host name, network address, and so forth. Further, the configuration request may include logical references to specify attributes of a security configuration. The logical references may be logical names or identifiers that do not include any sensitive or secret information.

In response to the configuration request, the configuration module 135 may read security elements 145 from the secure storage 140 that correspond to the logical references in the configuration request. For example, in response to a configuration request including a first logical reference specifying a type and/or format of encryption key, the configuration module 135 may access the secure storage 140 to access a stored encryption key matching the first logical reference. The configuration module 135 may then perform the requested configuration of a computing device 160 using the accessed encryption key.

In some implementations, the configuration module 135 may generate a deployment plan in response to a configuration request. The configuration module 135 may then configure and deploy a computing device 160 using the deployment plan. In some examples, the configuration module 135 may use the deployment plan to generate an operating system image for a computing device 160 (e.g., a stateless server).

In some examples, the configuration module 135 may generate the operating system image by cloning a master OS image, and modifying the cloned OS image according to server-specific attributes in the configuration request. An example implementation using a deployment plan and an operating system image is discussed below with reference to FIGS. 2-3.

Figure 2:
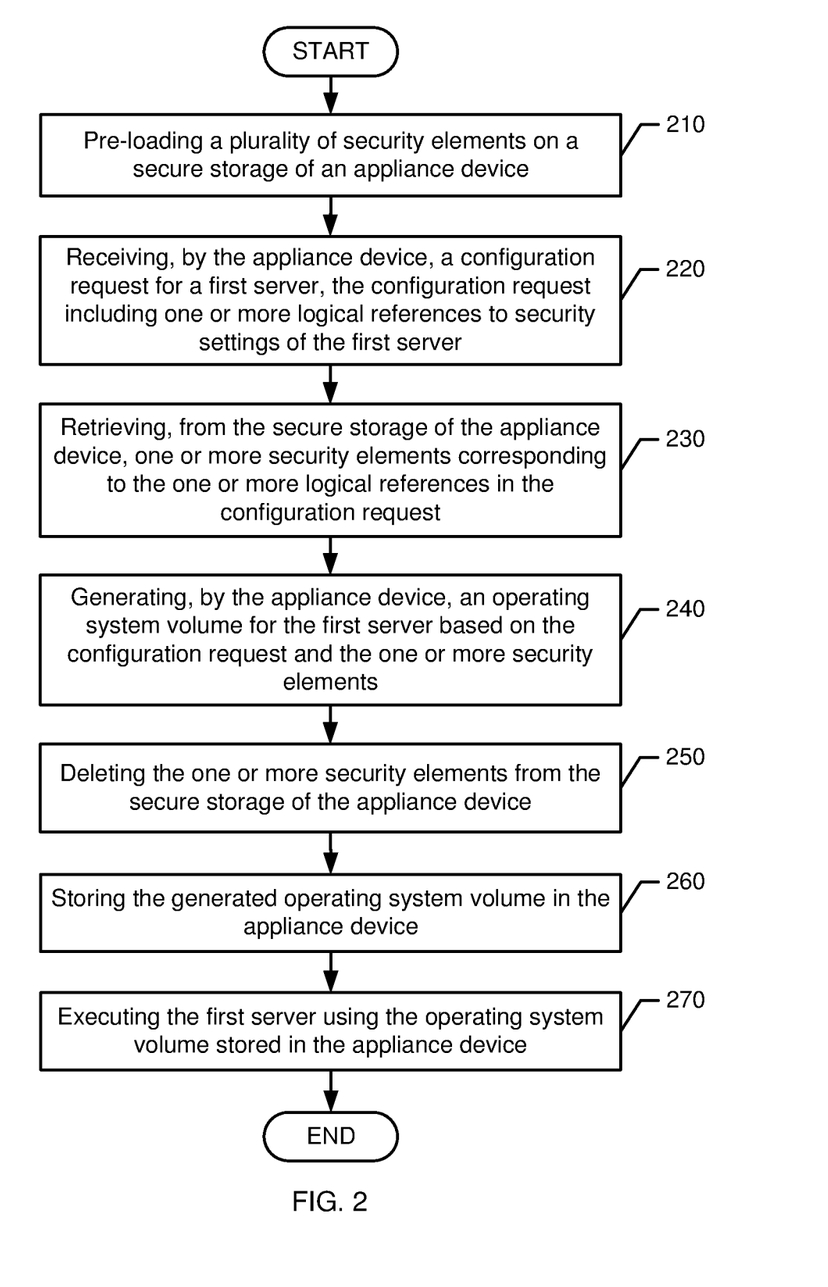
FIG. 2 is an illustration of an example process, in accordance with some implementations.

Referring now to FIG. 2, shown is a flowchart of an example configuration process 200, in accordance with some implementations. For the sake of illustration, details of the process 200 may be described below with reference to FIG. 3, which show an example implementation. One or more components shown in FIG. 3 may correspond generally to one or more components of the system 100 (shown in FIG. 1). For example, the appliance device 310 may correspond generally to an example implementation of the management device 110. However, other implementations are also possible.

The process 200 may be implemented in hardware or machine-readable instructions (e.g., software and/or firmware). The machine-readable instructions are stored in a non-transitory computer readable medium, such as an optical, semiconductor, or magnetic storage device.

As shown in FIG. 2, block 210 may include pre-loading a plurality of security elements on a secure storage of an appliance device. For example, referring to FIG. 3, an appliance device 310 may be mounted in a server enclosure 300 (e.g., a rack), and may include an encrypted storage 320.

Figure 3:
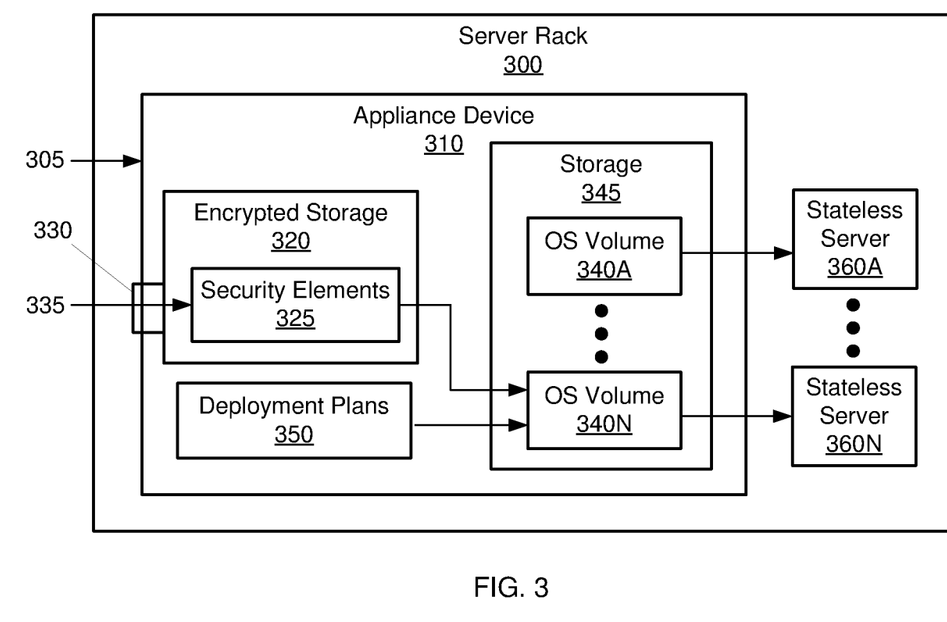
FIG. 3 is an illustration of an example system, in accordance with some implementations.

As shown, the encrypted storage 320 may be pre-loaded 335 with security elements 325 via a write-only interface 330. Examples of the security elements 325 may include passwords, certificates, security settings, licenses, keys, and so forth. In some implementations, the appliance device 310 may be pre-loaded with one or more deployment plans 355. Each deployment plan 355 may specify security attributes using logical references, and without including secret information (e.g., actual security settings). Each deployment plan 355 may specify how to build and configure an operating system (OS) image to be deployed to a computing device (e.g., a golden image OS volume).

Block 220 may include receiving, by the appliance device, a configuration request for a first server, where the configuration request includes one or more logical references to security settings of the first server. For example, referring to FIG. 3, the appliance device 310 may receive a configuration request 355 including logical references to security settings. In some examples, the configuration request 355 may be received from a client device via a network (not shown). In other examples, the configuration request 355 may be generated by a user interacting with an interface of the appliance device 310.

Block 230 may include retrieving, from the secure storage of the appliance device, one or more security elements corresponding to the one or more logical references in the configuration request. For example, referring to FIG. 3, the appliance device 310 may select a subset of the security elements 325 that match the logical references in the configuration request 355.

Block 240 may include generating, by the appliance device, an operating system volume for the first server based on the configuration request and the one or more security elements. For example, referring to FIG. 3, the appliance device 310 may generate an operating system (OS) volume 340N based on the configuration request 355 and the subset of security elements 325. In some examples, the appliance device 310 may use a security element 325 to directly populate a security setting or value. Further, in other examples, the appliance device 310 may use a security element 325 to generate a new data that can then be used as a security setting or value (e.g., to generate a public key infrastructure (PKI) certificate). In some implementations, each security element 325 may be deleted from the appliance device 310 after being used to generate an operating system volume.

Block 250 may include deleting the one or more security elements from the secure storage of the appliance device. For example, referring to FIG. 3, the appliance device 310 may delete the subset of security elements 325 that were used to generate the OS volume 340N.

Block 260 may include storing the generated operating system volume in the appliance device. Block 270 may include executing the first server using the operating system volume stored in the appliance device. After block 270, the process 200 may be completed. For example, referring to FIG. 3, the appliance device 310 may store the OS volume 340N in a storage 345. The stateless server 360N may execute using the OS volume 340N that is externally stored in the storage 345 of the appliance device 310. In some implementations, the storage 345 may store multiple OS volumes 340A-340N that are executed by multiple stateless servers 360A-360N that are mounted in the enclosure 300. In some examples, each of the stateless servers 360A-360N may be a physical server that includes a processor, but lacks internal storage (e.g., hard disk, flash storage, etc.) for storing operating system and application data. In such examples, the stateless servers 360A-360N may execute using the storage 345 of the appliance device 310 to store their respective operating system and application data. Note that, while some examples discussed herein include stateless servers that execute OS volumes stored in an appliance device, implementations are not limited in this regard. For example, implementations may include configuration of security settings for a device that stores its own operating system, for a device using a network boot, for a device using a configured boot image that is not an OS image, and so forth.

Figure 4:
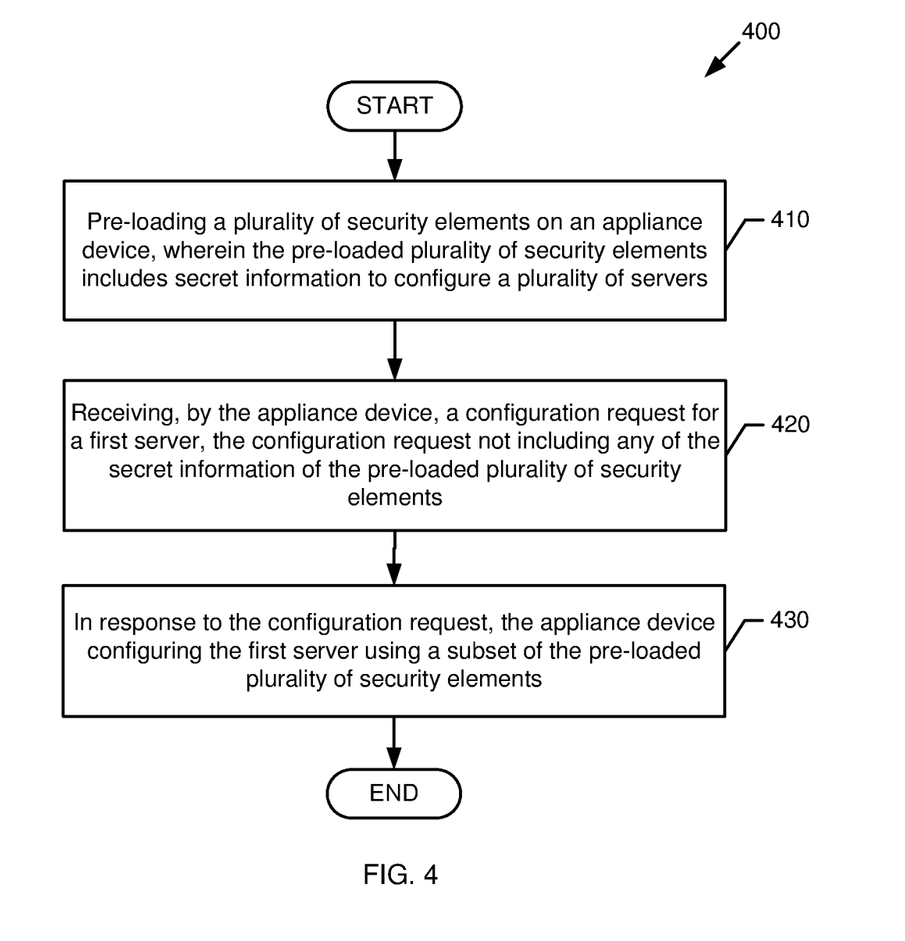
FIG. 4 is an illustration of an example process, in accordance with some implementations.

Referring now to FIG. 4, shown is a flowchart of an example configuration process 400, in accordance with some implementations. For the sake of illustration, details of the process 400 may be described below with reference to FIG. 3, which shows an example implementation. However, other implementations are also possible.

The process 400 may be implemented in hardware (e.g., circuitry) or machine-readable instructions (e.g., software and/or firmware). The machine-readable instructions are stored in a non-transitory computer readable medium, such as an optical, semiconductor, or magnetic storage device.

As shown in FIG. 4, block 410 may include pre-loading a plurality of security elements on an appliance device, where the pre-loaded plurality of security elements includes secret information to configure a plurality of servers. For example, referring to FIG. 3, the encrypted storage 320 may be pre-loaded 335 with security elements 325 via a write-only interface 330. The security elements 325 may include a number of secret data elements that is sufficient to configure multiple servers (e.g., passwords, certificates, security settings, licenses, keys, etc.). However, the security elements 325 may be pre-loaded into the encrypted storage 320 before the appliance device 310 receives any configuration request for such multiple servers.

Block 420 may include receiving, by the appliance device, a configuration request for a first server, the configuration request not including any of the secret information of the pre-loaded plurality of security elements. For example, referring to FIG. 3, the appliance device 310 may receive a configuration request 355 that does not include sensitive security information (e.g., passwords, keys, etc.). Rather, the configuration request 355 may include logical references that allow the appliance device 310 to determine or generate the sensitive security information.

Block 430 may include, in response to the configuration request, the appliance device configuring the first server using a subset of the pre-loaded plurality of security elements. For example, referring to FIG. 3, the appliance device 310 may select a portion of the security elements 325 that match the logical references in the configuration request 355, and may generate or configure the OS volume 340N based on the configuration request 355 and the subset of security elements 325. After block 430, the process 400 may be completed.

Figure 5:
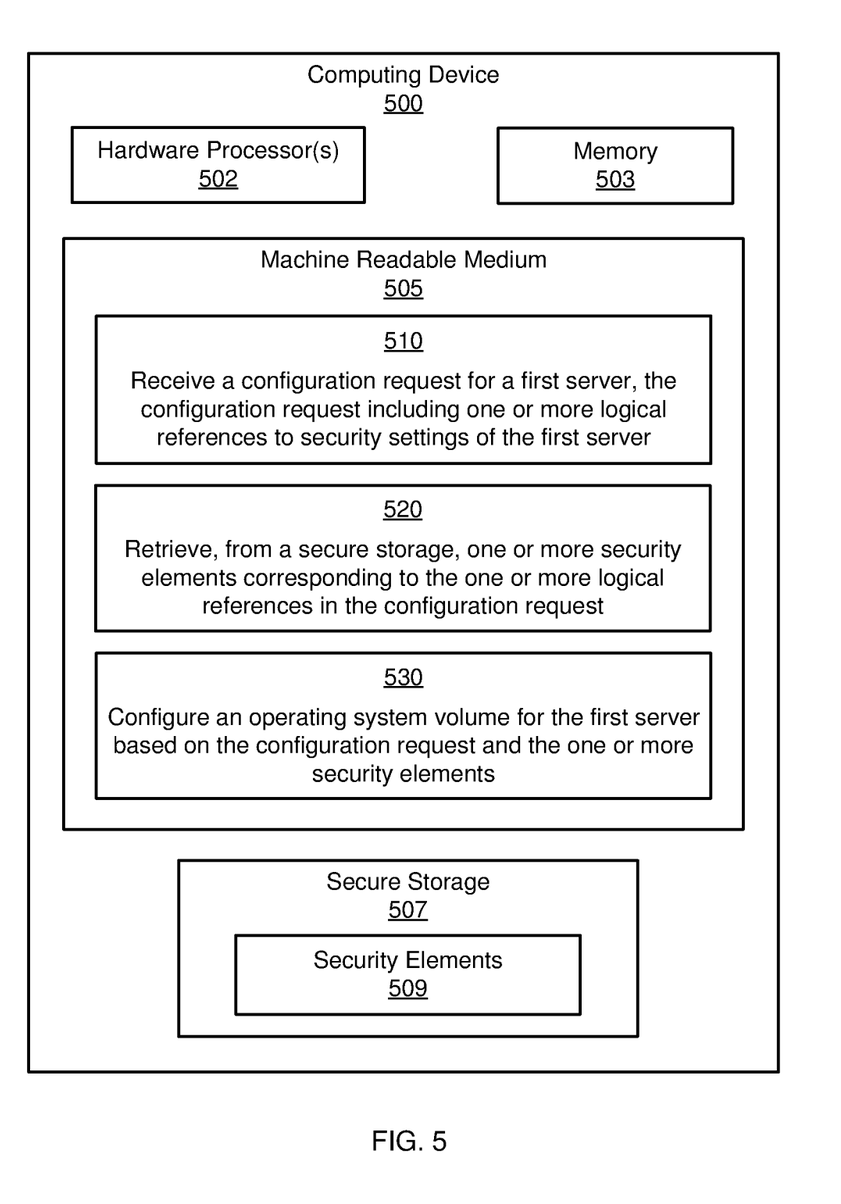
FIG. 5 is a schematic diagram of an example computing device, in accordance with some implementations.

Referring now to FIG. 5, shown is a schematic diagram of an example computing device 500. In some examples, the computing device 500 may correspond generally to the management device 110 (shown in FIG. 1) and/or the appliance device 310 (shown in FIG. 3). As shown, the computing device 500 may include hardware processor(s) 502, memory 503, a machine-readable storage medium 505 including instructions 510-530, and a secure storage 507 pre-loaded with a set of security elements 509. The machine-readable storage medium 505 and/or the secure storage 507 may be a non-transitory medium. The secure storage 507 may be encrypted and/or may be unreadable from outside the computing device 500.

The instructions 510-530 may be executable by the hardware processor(s) 502. For the sake of illustration, details of instructions 510-530 may be described below with reference to FIG. 3, which shows an example implementation. However, other implementations are also possible.

The hardware processor(s) 502 may include a general purpose microprocessor, a specialized controller, a processor module or subsystem, a programmable integrated circuit, a programmable gate array, multiple processors, a microprocessor including multiple processing cores, and so forth. The memory 503 may include any type of computer memory (e.g., dynamic random access memory (DRAM), static random-access memory (SRAM), etc.).

Instruction 510 may be executed to receive a configuration request for a first server, where the configuration request includes one or more logical references to security settings of the first server. For example, referring to FIG. 3, the encrypted storage 320 may be pre-loaded 335 with security elements 325 via a write-only interface 330. The security elements 325 may include a number of secret data elements that is sufficient to configure multiple servers, but may be pre-loaded into the encrypted storage 320 before the appliance device 310 receives any configuration request for such multiple servers.

Instruction 520 may be executed to retrieve, from a secure storage, one or more security elements corresponding to the one or more logical references in the configuration request (e.g., a subset of the security elements 509 in secure storage 507). For example, referring to FIG. 3, the appliance device 310 may receive a configuration request 355 that does not include sensitive security information, and instead includes logical references that allow the appliance device 310 to determine or generate the sensitive security information.

Instruction 530 may be executed to configure an operating system volume for the first server based on the configuration request and the one or more security elements. For example, referring to FIG. 3, the appliance device 310 may select a subset of the security elements 325 based on the logical references in the configuration request 355, and may generate or configure the OS volume 340N based on the configuration request 355 and the subset of security elements 325.

Figure 6:
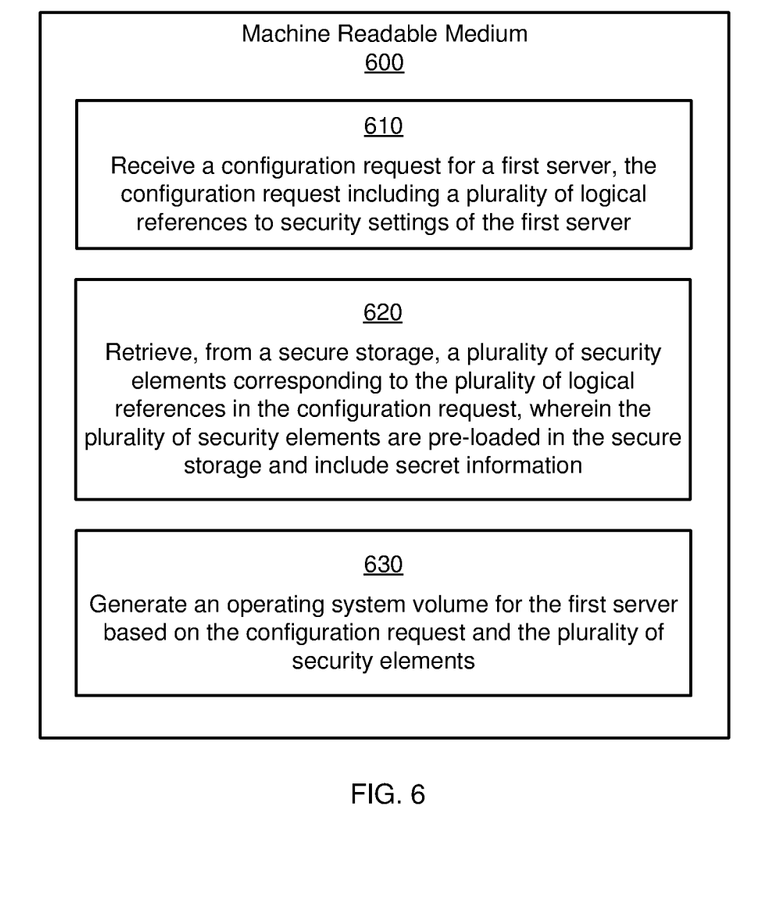
FIG. 6 is a diagram of an example machine-readable medium storing instructions in accordance with some implementations.

Referring now to FIG. 6, shown is machine-readable medium 600 storing instructions 610-630, in accordance with some implementations. The instructions 610-630 can be executed by one or more hardware processors. The machine-readable medium 600 may be a non-transitory storage medium, such as an optical, semiconductor, or magnetic storage medium. For the sake of illustration, details of instructions 610-630 may be described below with reference to FIG. 3, which shows an example implementation. However, other implementations are also possible.

Instruction 610 may be executed to receive a configuration request for a first server, the configuration request including a plurality of logical references to security settings of the first server. For example, referring to FIG. 3, the encrypted storage 320 may be pre-loaded 335 with security elements 325 via a write-only interface 330. The security elements 325 may include a number of secret data elements that is sufficient to configure multiple servers, but may be pre-loaded into the encrypted storage 320 before the appliance device 310 receives any configuration request for such multiple servers.

Instruction 620 may be executed to retrieve, from a secure storage, a plurality of security elements corresponding to the plurality of logical references in the configuration request, where the plurality of security elements are pre-loaded in the secure storage and include secret information. For example, referring to FIG. 3, the appliance device 310 may receive a configuration request 355 that does not include sensitive security information (e.g., passwords, keys, etc.). Rather, the configuration request 355 may include logical references that allow the appliance device 310 to determine or generate the sensitive security information.

Instruction 630 may be executed to generate an operating system volume for the first server based on the configuration request and the plurality of security elements. For example, referring to FIG. 3, the appliance device 310 may select a subset of the security elements 325 based on the logical references in the configuration request 355, and may generate or configure the OS volume 340N based on the configuration request 355 and the subset of security elements 325.

Figure 7:
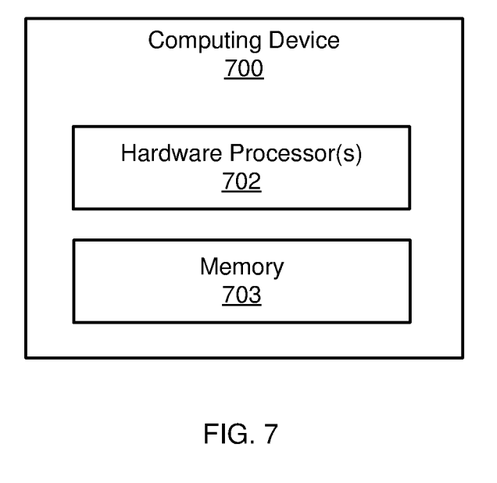
FIG. 7 is a schematic diagram of an example computing device, in accordance with some implementations.

Referring now to FIG. 7, shown is a schematic diagram of an example computing device 700. In some examples, the computing device 700 may correspond generally to one of the stateless servers 360A-360N shown in FIG. 3). As shown, the computing device 700 may include hardware processor(s) 702 and memory 703.

The hardware processor(s) 702 may include a general purpose microprocessor, a specialized controller, a processor module or subsystem, a programmable integrated circuit, a programmable gate array, multiple processors, a microprocessor including multiple processing cores, and so forth. The memory 703 may include any type of computer memory (e.g., dynamic random access memory (DRAM), static random-access memory (SRAM), etc.).

In some implementations, the computing device 700 may lack a storage device for storing operating system and application data. For example, the computing device 700 may boot and execute using an operating system image stored on a remote device (e.g., OS volume 340N stored in the appliance device 310, as shown in FIG. 3).

In accordance with some implementations, examples may provide secure configuration of servers. In some implementations, a management device or appliance may include a secure storage that is pre-loaded with security elements for configuring multiple computing devices (e.g., servers). The stored security elements may include passwords, certificates, security settings, licenses, keys, and so forth. The stored security elements may be unreadable from outside the device. Upon receiving a configuration request, the device may automatically configure a server using a subset of the stored security elements, and may optionally delete the used security elements. Accordingly, servers may be automatically configured with security information in a manner that reduces the risk of human error and/or data theft.

Note that, while FIGS. 1-7 show various examples, implementations are not limited in this regard. For example, referring to FIG. 1, it is contemplated that system 100 may include additional devices, different devices, different components, different connection paths, different protocols, and so forth. In another example, it is contemplated that the management device 110 and/or the computing devices 160 may include various software components and/or hardware components (e.g., processors, memory, storage devices, etc.). In still another example, while not shown in each of FIG. 1-7, the devices described above may include additional components, such as memory (e.g., dynamic random access memory (DRAM)), processors, controllers, storage devices, buses, switches, batteries, antennas, display devices, input devices, power supplies, and so forth. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing device comprising:
   a secure storage to store a plurality of security elements comprising secret information, each security element to be used to configure a server after that security element is retrieved from the secure storage;

a processor; and
- a storage medium including instructions executable by the processor to:
  - receive a configuration request for a first server, the configuration request including one or more logical references to security settings of the first server;
  - retrieve, from the secure storage, one or more security elements corresponding to the one or more logical references in the configuration request, wherein the retrieved one or more security elements include secret information and are not included in the configuration request; and
  - configure an operating system volume for the first server based on the configuration request and the retrieved one or more security elements.

2. The computing device of claim 1, wherein the plurality of security elements are pre-loaded into the secure storage prior to a receipt of the configuration request, wherein the plurality of security elements are sufficient to configure a plurality of servers, and wherein the plurality of security elements are stored in the secure storage in encrypted form.

3. The computing device of claim 2, wherein the computing device is an appliance device for configuring the plurality of servers, and wherein the plurality of security elements are pre-loaded via a write-only interface of the appliance device.

4. The computing device of claim 3, wherein the appliance device and the plurality of servers are mounted in a first server enclosure, and wherein the appliance device is to configure the plurality of servers when mounted in the first server enclosure.

5. The computing device of claim 3, wherein each of the plurality of servers is a stateless server, and wherein each stateless server is to execute a corresponding one of a plurality of operating system volumes stored in the appliance device.

6. The computing device of claim 1, wherein the plurality of security elements comprises a plurality of passwords.

7. The computing device of claim 1, the instructions executable by the processor to:
- delete the one or more security elements from the secure storage upon configuration of the operating system volume for the first server.

8. A non-transitory machine-readable storage medium storing instructions that upon execution cause a processor of a computing device to:
- receive a configuration request for a first server, the configuration request including a plurality of logical references to security settings of the first server;
- retrieve, from a secure storage, a plurality of security elements corresponding to the plurality of logical references in the configuration request, wherein the retrieved plurality of security elements are preloaded in the secure storage and include secret information, wherein the retrieved plurality of security elements are not included in the configuration request, and wherein each security element to be used to configure a server after that security element is retrieved from the secure storage; and
- generate an operating system volume for the first server based on the configuration request and the retrieved plurality of security elements.

9. The non-transitory machine-readable storage medium of claim 8, wherein the plurality of security elements are pre-loaded into the secure storage via a write-only interface prior to a receipt of the configuration request, and wherein the plurality of security elements are stored in the secure storage in encrypted form.

10. The non-transitory machine-readable storage medium of claim 8, wherein the secure storage is included in an appliance mounted in a server enclosure, and wherein the appliance is associated with a plurality of servers mounted in the server enclosure.

11. The non-transitory machine-readable storage medium of claim 10, wherein each of the plurality of servers is a stateless server, wherein each stateless server is to execute a corresponding one of a plurality of operating system volumes stored in the appliance.

12. The non-transitory machine-readable storage medium of claim 8, wherein the plurality of security elements comprises a plurality of seeds for generation of public key infrastructure (PKI) certificates.

13. The non-transitory machine-readable storage medium of claim 8, wherein the instructions cause the processor to:
- delete the plurality of security elements from the secure storage upon generation of the operating system volume for the first server.

* * * * *